Figure 1A:
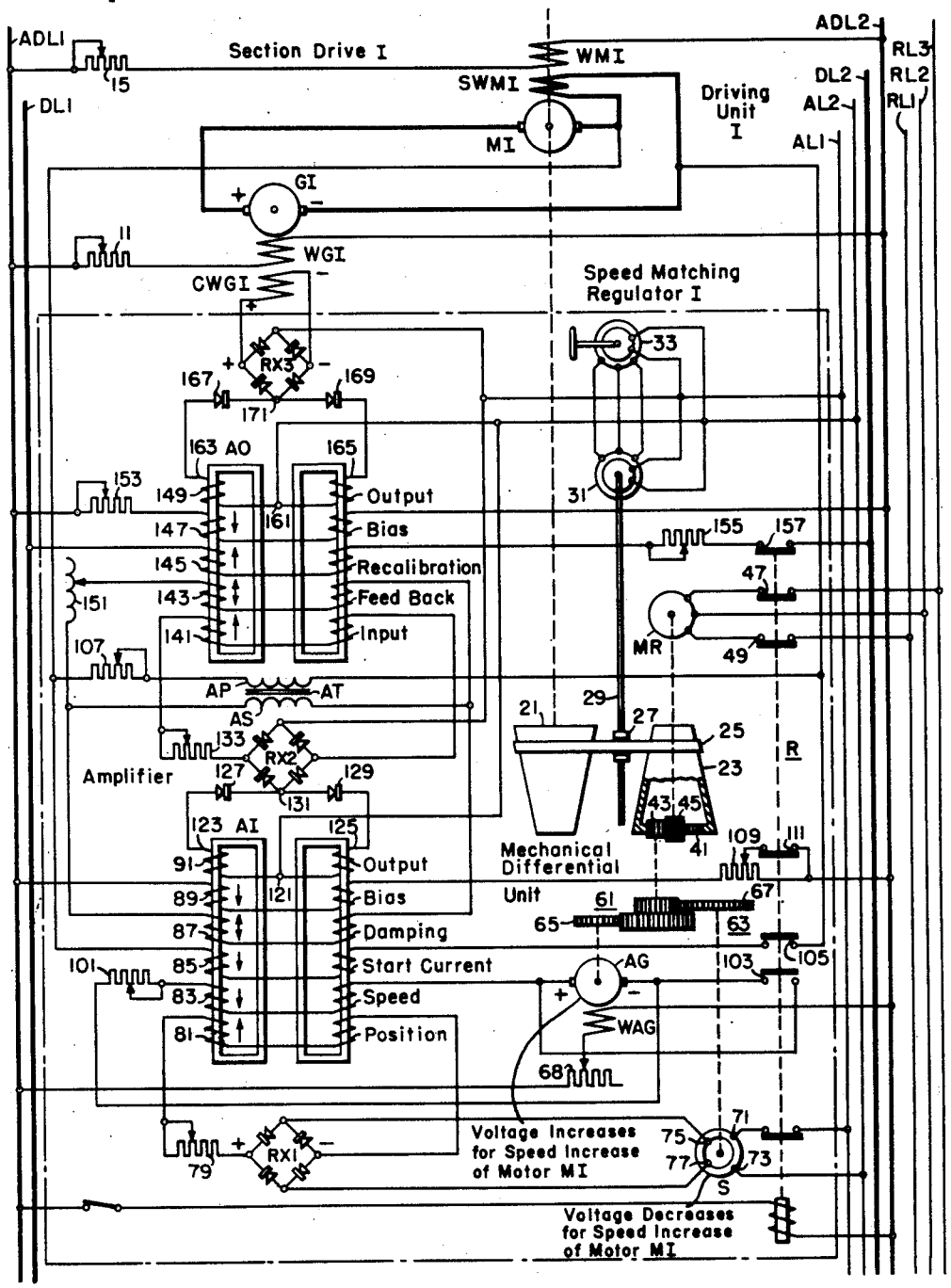

United States Patent Office 2,788,479
Patented Apr. 9, 1957

2,788,479

REGULATING APPARATUS

James P. Montgomery, Jr., Akron, Ohio, assignor to Westinghouse Electric Corporation, East Pittsburgh, Pa., a corporation of Pennsylvania Application April 14, 1955, Serial No. 501,222

6 Claims. (Cl. 318—146)

This invention relates to regulating apparatus and has particular relation to regulators for sectional paper mill drives. This application relates to the subject matter of an application Serial No. 501,223, filed concurrently herewith to James P. Montgomery, Jr. and D. A. Poepsel and assigned to Westinghouse Electric Corporation. The latter application and the applications mentioned therein are incorporated in this application by reference.

Sectional paper mill drives include a plurality of driving sections for advancing a web of pulp as it is being formed into paper. Each section includes a separate drive for the web and to prevent rupture or piling up of the web each of the drives must be regulated so that the drives operate as a coordinated unit. The practice in accordance with the teachings of the prior art has been to provide regulated drives of at least two different types.

Sectional drives of one type are called single-generator drives and in such apparatus, each of the drives includes only a motor for driving the web, the motors of all of the drives being supplied from a single regulated master generator. The motors in the single-generator drives are controlled from mechanical differential units in each of the drives. These units are matched to the master generator and operate in accordance with output of this generator.

Sectional drives of the other type are called multiple-generator drives, and in this type each sectional drive includes a generator and a motor. The generator supplies current to the motor and its output is controlled from a mechanical differential unit to vary the motor speed and correct for variations in the web. In sectional regulators of this type, a master set is provided for maintaining the drives in cooperative operation. This master set includes a direct current generator supplied from a regulated source, a direct current motor supplied by the generator, the speed of the motor being maintained constant by the operation of the regulated source, and an alternating current variable frequency generator for supplying a reference signal to the sectional drives. In apparatus of this type the production rate, that is, the rate at which paper is supplied, may be changed by changing the output of the generator of the master set.

This invention in its specific aspects relates to regulators of the multiple-generator type. In its broader aspects the concept involved in this invention is also applicable to the single generator drive and to the extent that this invention is so applicable, any such use is intended to fall wthin the scope of this application.

It is necessary that the production rate of the paper vary over a wide range of the order of ten to one but in using the multiple generator drives it has been found that the regulating apparatus is effective only over a smaller range of production rates of the order of six to one. And even over this range the available regulation is not as precise as is desired.

It is accordingly specifically an object of this invention to provide regulation for a sectional paper mill having a drive of the multiple-generator type which shall be effective over a wide range.

It is a further specific object of the invention to provide a sectional paper mill drive which shall be regulated precisely over a wide range of production rates.

Another object of this invention is to provide a novel regulating system for a sectional paper mill drive in which each of the sections includes a mechanical differential unit cooperative with a magnetic amplifier to produce the desired regulation.

The invention in its specific aspects arises from the realization that the ineffectiveness of the prior art multiple-generator drives is caused by the inability of the generators in each of the sections to follow the command signals over the whole range over which the speed of the motor of each drive is to vary. It has been realized that this range includes not only the fluctuations in the web at any setting of the master set, but also the variations introduced by changing the master set for the purpose of changing the production rate of the paper. It has been recognized that one important source of difficulty is the rotating inductor or rotary transformer which in each section delivers the signal indicating change of position of the web. The rotor of this inductor rotates in one direction or the other from a point at which it is initially set as the position of the web changes and as it rotates the voltage of the output of the inductor changes; this change in voltage being the signal indicating the change in position of the web. The range over which the voltage may change is limited. As the master set is changed to attain different production rates the position of the rotor of the inductor motor also changes. Thus a large proportion of the available range of variation of the inductor motor is taken up by the changes of the master set.

In accordance with the specific aspects of the invention this deficiency of the section regulators is overcome by biasing each of the magnetic amplifiers from the output of the master set generator. At any setting of the master set generator, the generator of each section is controlled from a magnetic amplifier biased in accordance with this setting. The mechanical differential unit and the generator of each section then responds to fluctuations about the setting. A change introduced into the generator by the operator when the production rate is to be changed is, in accordance with the invention, immediately impressed on the magnetic amplifiers, and thereafter the magnetic amplifiers operate about the new setting. The position signaling rotating inductors respond to the change in the master set only to the extent necessary to enable the different sections to operate as a unit; they do not follow the whole change in the master set. It is not necessary, then, that the mechanical differential unit and the generator of each section respond to the changes introduced by the operator. They need only respond to the fluctuations at any setting and this is well within their capabilities. Thus the full capabilities of the mechanical differential unit and the generator of each section can be applied to control the speed matching, the accuracy and the speed of response of the apparatus.

Figure 1B:
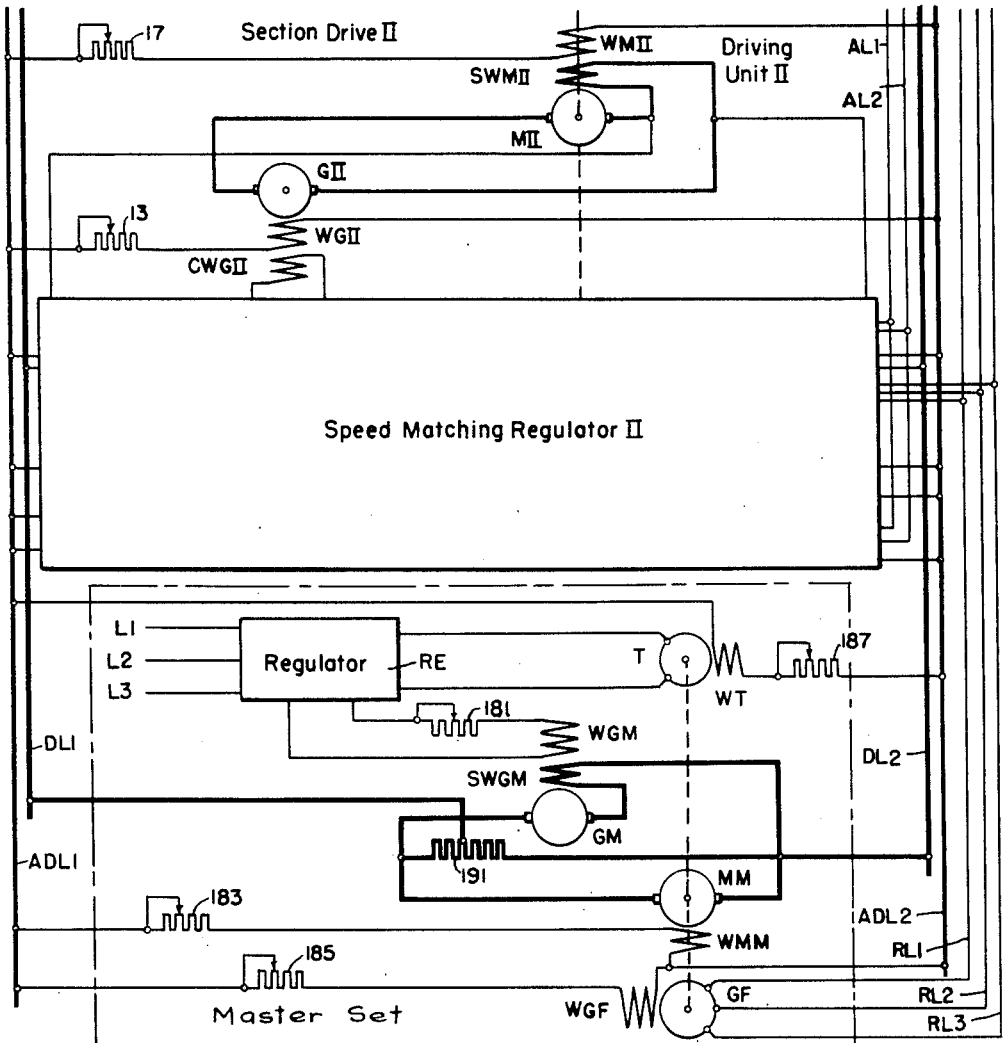
Figure 2:
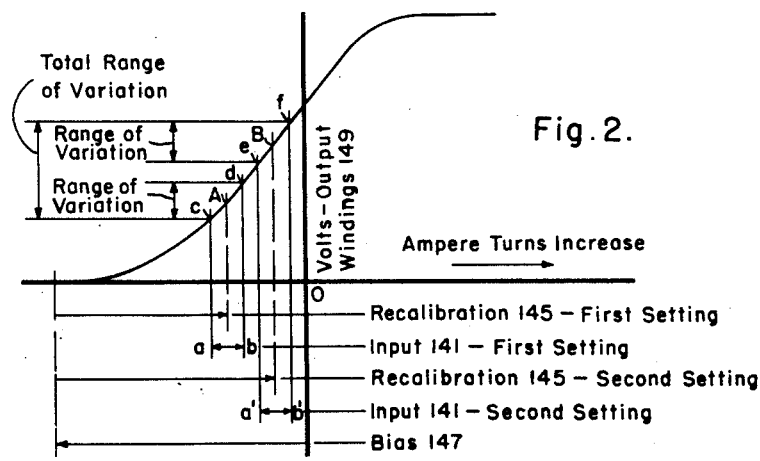

The novel features considered characteristic of this invention are set forth generally above. The invention itself, both as to its organization and its method of operation, together with additional objects and advantages thereof, will be understood from the following description of a specific embodiment when read in connection with the accompanying drawings, in which:

Figures 1A and 1B together constitute a circuit diagram of a sectional paper mill regulator; and Fig. 2 is a graph illustrating the operation of the apparatus in accordance with the invention.

The apparatus shown in Figs. 1A and 1B includes a Master Set and a pair of sectional drives labeled Sectional Drive I and Sectional Drive II of a sectional-drive paper mill regulator. Alternating current is supplied to this apparatus from the buses or conductors L1, L2 and L3 which may be connected to a commercial supply through the usual disconnects. Direct current power is supplied for routine purposes such as excitation from direct current buses or conductors ADL1 and ADL2. These buses may be energized from an auxiliary direct current generator or may derive their power from the conductors L1, L2, L3 through suitable rectifying apparatus.

Each Sectional Drive includes a Driving Unit labeled I and II to correspond to the associated drive and a Speed Matching Regulator labeled I and II to correspond to the associate sectional drive. Each Driving Unit includes a generator GI and GII and a motor MI and MII. Each generator GI and GII includes a shunt winding WGI and WGII supplied through a variable resistor 11 and 13 from the conductors ADL1 and ADL2 and another shunt winding CWGI and CWGII which is supplied from the output of the Amplifier of the associated Speed Matching Regulator. Each motor MI and MII includes a shunt field winding WMI and WMII supplied through a variable resistor 15 and 17 from the conductors ADL1 and ADL2 and a series field winding SWMI and SWMII which is connected across the brushes of the associated generator GI and GII through the armature of the associated motor MI and MII.

Speed Matching Regulators I and II are alike. Only Regulator I is shown in detail and in the following discussion reference will be made to it. Speed Matching Regulator I includes a Mechanical Differential Unit and an Amplifier.

The Mechanical Differential Unit includes a pair of cone pulleys 21 and 23 interconnected through a belt 25. The belt is set by a yoke 27 which is coupled to a threaded shaft 29 in turn driven from a receiver synchrotie 31 supplied from a remote transmitter synchrotie 33, the rotor of which may be rotated by the operator to vary the speed of the web in the section. One of the cone pulleys 21 is driven directly from the motor MI and its rotational speed depends on the speed of movement of the web. The other cone pulley 23 is driven through a differential including a ring gear 41 secured circumferentially to the pulley 23, a planetary gear 43 in engagement with the ring gear 41 and a sun gear 45 which is driven from a three-phase alternating current reference motor MR energized from the three-phase variable frequency conductors RL1, RL2, RL3 through the contacts 47 and 49 of a start-stop relay R. The conductors RL1, RL2 and RL3 derive their power from the Master Set and the frequency of this power is dependent on the output of a reference generator GF in the Master Set.

The planetary gear 43 is mechanically coupled to a pair of gear systems 61 and 63, the output gear 65 of one of which drives an auxiliary generator AG and the output gear 67 of the other the rotor of a rotating inductor or rotary generator S. The generator AG includes a field winding WAG supplied from the conductors ADL1 and ADL2 through a variable resistor 68. The gears in the gearing system 61 which drive the generator AG are so related that the speed of the rotor of the generator AG is higher than the speed of the movement of the planetary gear 43. The output of this generator is thus dependent on the rate of change of position or the speed of the web. The rotating inductor S is in effect a variable transformer having a secondary which is rotatable relative to its primary. The rotation of the secondary varies the coupling of the transformer and thus the output of the secondary depending on the position of the secondary. (See application 501,223 for further details.) The gearing system 63 which drives the inductor S is set to rotate the rotor at a lower speed than the movement of the planetary gear 43, and thus the inductor S responds to the change in position of the web.

The inductor S has input terminals 71 and 73 which are supplied from a pair of alternating current conductors AL1 and AL2 through a contact of the relay R. The conductors AL1 and AL2 may derive their power from two of the conductors L1, L2, L3 through suitable transformers (not shown). The inductor S also has output terminals 75 and 77 which are connected through a bridge rectifier RX1 and a variable resistor 79 to the input position windings 81 of the Amplifier.

The Amplifier includes an input stage amplifier AI and an output stage amplifier AO. The input stage amplifier includes, in addition to the input position windings 81, input speed windings 83, damping windings 87, bias windings 89, start current windings 85 and output windings 91. The input speed winding 83 of the amplifier AI is connected across the output brushes of the generator AG through a variable resistor 101. The relay R includes contacts 103 which shunt out the generator AG when the relay R is deenergized. These contacts are provided to prevent wide fluctuations in the amplifier AI when the reference motor MR is deenergized and coasts to a stop. The start current windings 85 are connected across the series field winding SWMI of the motor MI through a contact 105 of the relay R which is closed when the relay is deenergized. These start windings 85 draw current when the motor MI is being brought up to operating speed during the starting operation and thus facilitate the starting of the apparatus. The damping windings 87 are connected across the secondary AS of a transformer AT, the primary of which is connected through a variable resistor 107 across the series field winding SWMI of the motor MI. Current is induced in the damping winding 87 from the secondary AS only when the motor MI is increasing or decreasing in speed and this current prevents violent fluctuations of the motor speed. The bias windings 89 are connected between the conductors ADL1 and ADL2 through a variable resistor 109 and contacts 111 of relay R which are closed when the relay is energized. The variable resistor 109 sets the bias current which flows through the bias windings 89 and thus the point of operation on the characteristic of the amplifier AI. When the contacts 111 of relay R are open the whole resistor 109 is connected in series with the bias windings 89 and the bias current is reduced to facilitate the stopping of the operation of the apparatus.

The output windings 91 of the amplifier AI have a common junction 121 which is connected directly to conductor AL2. The other terminals 123 and 125 of the output windings 91 are connected together through a pair of rectifiers 127 and 129 poled to conductor positive current from one of the terminals 123 to the other 125. By positive current is meant the flow of ions or holes as distinguished from electrons. The junction 131 of the rectifiers 127 and 129 is connected through a rectifier bridge RX2 to the conductor AL1. The bridge RX2 has a pair of terminals from which direct current is derivable, and these terminals are connected through a variable resistor 133 to the input windings 141 of the amplifier AO.

The output amplifier AO includes, in addition to the input windings 141, feedback windings 143, recalibrating windings 145, bias windings 147 and output windings 149. The feedback windings 143 are connected across the secondary AS through a variable reactor 151. These windings 143 respond to variations in the series field current of the motor MI to produce a feedback effect which prevents hunting. The bias windings 147 are connected through a variable resistor 153 between the conductors ADL1 and ADL2.

The recalibrating windings 145 are connected in accordance with the invention between the conductors DL1 and DL2 through a variable resistor 155 and contacts 157 of the relay R which are closed when the relay is energized. The conductors DL1 and DL2 derive their power from the generator GM of the Master Set. The current supplied through the recalibrating windings 145 thus superimposes a bias on that provided by the bias windings 147 which is dependent on the setting of the Master Set. The output windings 149 of the amplifier AO has a common junction 161 which is connected to the conductor AL2. The other terminals 163 and 165 of the output windings are connected together through a pair of rectifiers 167 and 169 poled to conduct positive current from one of the terminals 163 to the other 165. The junction 171 of the rectifiers 167 and 169 is connected through a bridge rectifier RX3 to the conductor AL1. The rectifier RX3 has a pair of terminals from which direct current is derivable and these terminals are connected to supply the direct current to the controlling field winding CWGI of the generator GI.

The relationship of the fluxes produced by the ampere currents flowing through the various control windings of the amplifiers AI and AO is shown by the arrows adjacent the various windings. Arrows pointing up mean that an increase in current through the control windings results in an increase in current through the output windings, and arrows pointing down mean that an increase in current in the control windings cause a decrease in current through the output windings. Thus an increase in the current through the bias windings 147 would decrease the current through the output windings 149 and an increase in the current through the recalibrating windings 145 would increase the current through the output windings. The recalibrating windings should preferably produce a flux effect of the same sense as the input windings.

The Master Set includes, in addition to the generator GM, and the generator GF, a motor MM supplied from the generator GM and which drives the generator GF. The Master Set also includes a regulator RE which derives its power from the conductors L1, L2, L3 and is capable of maintaining the voltage of the generator GM constant. For regulating purposes the regulator RE derives a signal from a tachometer T driven by the motor MM. The generator GM includes a parallel field winding WGM and a series field winding SWGM. The parallel field winding WGM is supplied with regulating current from the regulator RE through a variable resistor 181. The resistor 181 may be set by the operator in accordance with the production rate desired. The motor MM has a shunt field winding WMM connected through a variable resistor 183 between the conductors ADL1 and ADL2. The reference generator GF has a shunt field winding WGF connected between the conductors ADL1 and ADL2 through a variable resistor 185. The tachometer T has a shunt field winding WT connected between the conductors ADL1 and ADL2 through a variable resistor 187.

The generator GM drives the motor MM, and its output brushes are connected across the brushes of the motor MM through the field SWGM. The conductors DL1 and DL2 derive their power from the generator GM, the conductor DL1 being connected to an intermediate terminal on a resistor 191 connected across the generator GM and the winding SWGM and the conductor DL2 being connected to the series field winding SWGM. The potential between conductors DL1 and DL2 is thus dependent on the setting which controls the output potential of the generator GM, and this is the setting which determines the production rate of the line. Since the recalibrating windings 145 are supplied with bias current from the conductors DL1 and DL2, this bias is also dependent on the setting which determines the production line rate. The Amplifier may thus be set for different production line rates and then operates about these settings to produce the desired regulation. When the potential between the conductors DL1 and DL2 is reset the generator S of each section changes only sufficiently to stabilize the operation of the mill. This is a small change which is necessitated by the fact that different sections may respond differently to the change in the Master Set.

The manner in which the apparatus in accordance with the invention operates is illustrated in Fig. 2. This is a graph showing the effect of currents of different magnitude on the output of the amplifier AO. Volts delivered at the output windings 149 is plotted vertically as a function of the ampere turns of the input windings 141, 145 and 147. The curve is the characteristic of the amplifier AO with reference to an arbitrary center of coordinates O. The effect on the actual output of the amplifier of varying the output of the master generator is shown by considering two settings, a "1st setting" and a "2nd setting."

The bias current through windings 145 is the same for both settings; it is set as shown by the arrow to bias the amplifier AO to cut-off. The recalibrating winding 1st setting reduces the effect of the bias setting so that the operation is about point A. It may be assumed that the normal variation of the input current is between $a$ and $b$, and the output current varies between $c$ and $d$.

The 2nd setting of the recalibrating winding results from an increase in the potential of the master generator GM. The effect of this is to reduce further the effect of the bias so that the operation is now about the point B. For variation in the input between $a'$ and $b'$ the variation in the output is now between $e$ and $f$. The range of variation thus produced at each setting is seen to be small and is readily handled by the associated generator GI or GII. Thus at each setting of the master generator GM the settings of the Speed Matching Regulator is available to control the speed matching accuracy and speed of response.

In apparatus which does not embody this invention, a change in the setting of the Master Set would require the Speed Matching Regulators to follow. This would result in the requirement that the Speed Matching Regulators produce regulation over the whole range of possible variation between $c$ and $f$ (Fig. 2). This total range is seen to be much larger than the fluctuation ranges $c—d$ and $e—f$. It has been found that the Speed Matching Regulator, fails to operate with the precision desired over such a total range.

In the use of the apparatus, the Master Set is set to produce the desired production rate. Thereafter, the motors MI and MII of the various sections are energized and the web is moved in accordance with the setting of the Master Set. Fluctuations in the web of any section are compensated by the associated Speed Matching Regulator and rupture or pileup of the web is thus avoided. Thus an increase in speed increases the current through windings 83 in turn decreases the current through windings 91 and 141 decreasing the current through windings 149 and decreasing the output of the generators and the speed of the motors. The increase in speed also decreases the current through windings 81 decreasing the current through windings 91 and 141 and decreasing the current through windings 149 and the speed of the motors. When the production rate is to be changed, the operator changes the output of the generator GM of the Master Set. This, in turn, changes the current flow through the recalibrating windings 145 of each of the amplifiers AO of the different sections. The output of the generators GI and GII of the sections is then changed to correspond to the new bias setting of the associated amplifiers AO, and thereafter the movement of the web is regulated about the new speed setting. At each settings the range of variations is maintained so small as to be well within the capabilities of the Speed Matching Regulator.

Thus when the output voltage of the generator GM is increased, the level of operation of the winding 149 is raised so that it supplies higher current to the filled windings CWGI, CWGII etc. of the generators GI, GII etc. At the instant of the change in the voltage of the master generator, the mechanical differential unit in each section senses that the paper speed is low and signals for an increase in the speed of the associated motor, say, MI, but the signal need have only a small effect because the motor speed is increased by the effect of the recalibrating winding 147.

In the use of the invention in a sectional paper mill of the multiple-generator type it has been found that it operates with the required precision over a wide production range of the order of 10 to 1. This wide range of operation with the required precision is achieved solely by voltage control as disclosed herein.

While a certain specific embodiment of the invention has been shown and described, many modifications are feasible. The invention, therefore, is not to be restricted except insofar as is necessitated by the spirit of the prior art.

I claim as my invention:

1. A regulator for a sectional web mill, which mill includes a plurality of sections, each section comprising the following: a separate drive for the web in said section, a separate magnetic amplifier means, said amplifier means having input winding means, output winding means and bias winding means, a separate mechanical differential unit, and separate signal output means connected to said unit, said output means including a rotating inductor responsive to changes in position of the web of the associated section through said unit, for supplying a signal in accordance with the movement of the web of said section, means coupling said unit to said drive to provide said unit with an input signal dependent on said drive, means connecting said signal output means to said input winding means, and means connecting said output winding means to said drive; said regulator also including a master set having a master generator having output buses; means coupling said generator to the input of each of said units to provide a reference signal in said input, whereby said signal output means produces a signal dependent on said drive and on said reference signal; and means for supplying biasing current to each said biasing winding means; the said regulator being characterized by biasing current supplying means including means connected directly to said buses for deriving at least a portion of the biasing current from said buses.

2. A regulator for a sectional web mill, which mill includes a plurality of sections, each of said sections comprising the following: a separate drive, each said separate drive including a motor and a generator connected to said motor to supply said motor, each of said generators having a controlling field winding, a separate magnetic amplifier means, said amplifier means having input winding means, output winding means and bias winding means, a separate mechanical differential unit, separate signal output means connected to said unit to produce an output signal dependent on said unit, means coupling said unit to said drive to provide said unit with an input signal dependent on said drive, means connecting said signal output means to said input winding means, and means connecting said output winding means to said field winding; the said regulator also including a master set having a master generator having output buses, means coupling said generator to the input of each of said units to provide a reference signal in said input of each said units, whereby said signal output means produces a signal dependent on said drive and on said reference signal, and means for supplying biasing current to each said biasing winding means; the said regulator being characterized by biasing current supplying means including means connected directly to said buses for deriving at least a portion of the biasing current from said buses.

3. A regulator for a sectional web mill, which mill includes a plurality of sections, each section comprising the following: a separate drive including a generator and a motor connected to said generator to be driven thereby, said generator having a control field winding, separate magnetic amplifier means, each such amplifier means including a plurality of amplifiers connected in cascade and having an input amplifier stage and an output amplifier stage and each said amplifier having input means connected to said input stage to receive an input signal thereto and output means connected in said output stage to derive an output signal therefrom, said output stage having a recalibrating winding, means connecting said output means to said control winding, a separate mechanical differential unit having input shafts and output signal means; means connecting said motor to one of said input shafts; and means connecting said output signaling means to said input means for impressing an output signal from said unit on said input means; said regulator including in addition to said sections a master generator set comprising a master generator having output buses, means connected to said master generator and operable at the will of an operator for setting the potential of said master generator at a predetermined magnitude corresponding to the desired production rate of said mill, and regulating means for maintaining the potential of said generator constant at any setting; said regulator further including means connected to said master generator and connected to another input shaft of said unit for supplying a reference signal to said unit dependent on the setting of said master generator; and means connecting said buses to said recalibrating windings of all said output stages to supply biasing current thereto.

4. A regulator for a sectional web mill, which mill includes a plurality of sections, each section comprising the following: a separate drive including a motor and having means for controlling the speed of said motor, separate magnetic amplifier means, each said amplifier means including a plurality of amplifiers connected in cascade and having an input amplifier stage and an output amplifier stage and each said amplifier having input means connected to said input stage to receive an input signal thereto and output means connected to said output stage to derive an output signal therefrom, said output stage having a recalibrating winding, means connecting said output means to said controlling means, a separate mechanical differential unit having input shafts and output signal means, means connecting said motor to one of said input shafts, and means connecting said output signaling means to said input means for impressing an output signal from said unit on said input means; said regulator including in addition to said sections a master generator set comprising a master generator having output buses, means connected to said master generator and operable at the will of an operator for setting the potential of said master generator at a predetermined magnitude corresponding to the desired production rate of said mill, and regulating means for maintaining the potential of said generator constant at any setting; said regulator further including means connected to said master generator and connected to another input shaft of said unit for supplying a reference signal to said unit dependent on the setting of said master generator; and means connecting said buses to said recalibrating windings of all said output stages to supply biasing current thereto.

5. A regulator according to claim 1 including power supply means independent of the master generator wherein each biasing winding means includes at least first windings and second windings, means connecting said independent means to said first windings, and means connecting the buses of said generator directly to said second windings.

6. A regulator according to claim 5 characterized by the fact that the input winding means and the second windings are connected so that the effect of a variation in current through each of said windings on the current through the output winding means is in the same sense.

References Cited in the file of this patent

UNITED STATES PATENTS 2,693,563   Hunt _____ Nov. 2, 1954